United States Patent Office 3,112,798
Patented Dec. 3, 1963

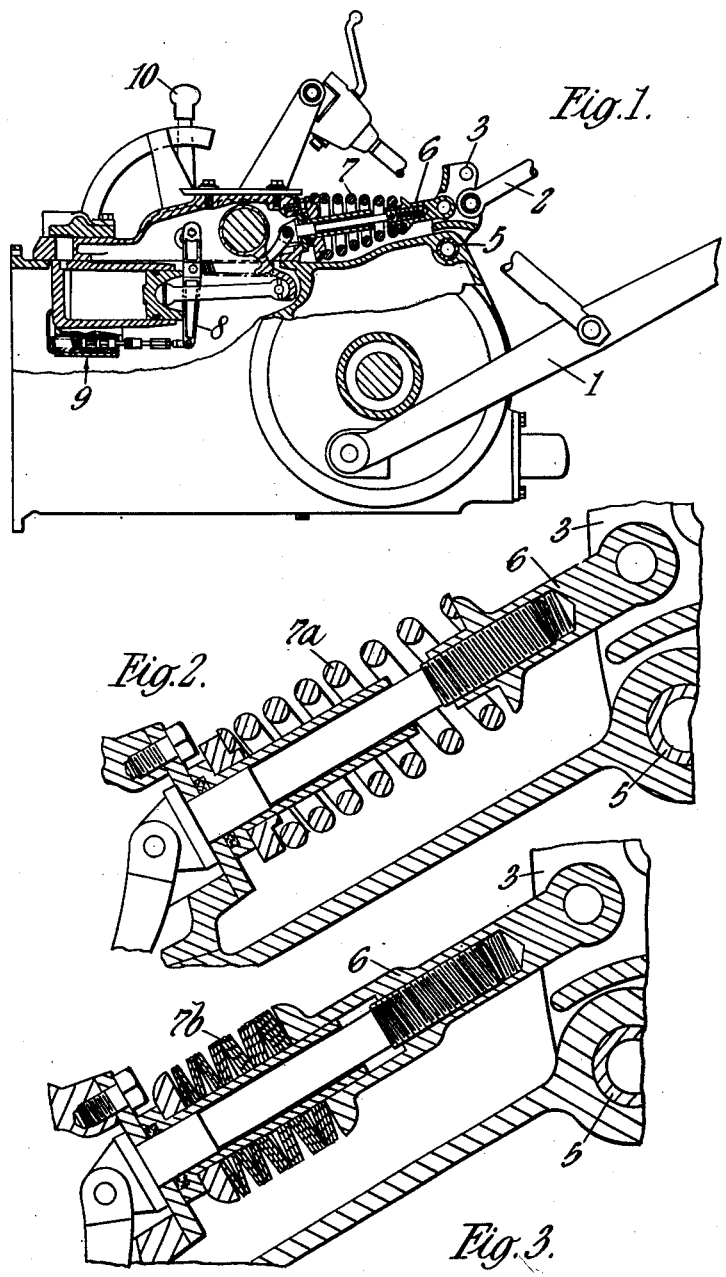

3,112,798
POWER-LIFTABLE HITCHES
William J. Foxwell, Romford, England, assignor to Ford Motor Company, Dearborn, Mich.
Filed Oct. 14, 1960, Ser. No. 62,776
Claims priority, application Great Britain Oct. 16, 1959
2 Claims. (Cl. 172—7)

This invention relates to tractors and, more specifically, to a power-liftable implement hitch of the type in which the height of a soil engaging implement is controlled automatically by variations in the draft or soil reaction of the implement, acting through a suitable linkage, against a load sensing device, such as a spring. The invention is shown applied to a conventional "three-point hitch" having top link draft control, but in its broader aspects also is applicable to hitches in which a draft spring is stressed directly by tension in the lower draft links.

The well-known 3-point hitch includes a pair of draft links pivotally connected to the rear axle housing of the tractor and extending rearwardly therefrom. A top link of the 3-point hitch connects the implement above the level of the draft links to a rocker which is pivotally mounted on the center housing and is pivotally connected to a draft sensing plunger in the center housing. The reaction or compressive force on the top link of the tractor varies generally with the amount of draft required to pull the implement through the soil.

The draft sensing plunger operates against the resistance of a spring, usually a compression spring, to control a valve for admitting hydraulic oil under pressure to a hydraulic ram or releasing oil from the ram to raise or lower the hitch and implement as required to maintain a substantially constant draft. An externally operated control lever, in effect, selects the load the spring must support in order for the control valve to be moved to neutral position in which oil is neither admitted nor released from the hydraulic ram. A load in excess of that for which the control lever is set will cause the draft links to raise and a load below that selected will cause the draft links to drop.

With certain implements and under certain conditions, the compressive load in the top link may be small, and it is then desirable that the mechanism shall be readily responsive to small changes in the load on the top link. On the other hand, for heavy draft implements the top link forces may be very high. Under such conditions, it is essential that the plunger spring be sufficiently stiff to avoid bottoming of the linkage with consequent loss of operation of the system. While certain arrangements for controlling the mechanical advantage between the top link and the draft plunger have been utilized, as by providing several link-attaching holes in the rocker in accordance with Brock U.S. Patent 2,624,257, desirable sensitivity under low top link loads must be sacrificed in order to accommodate heavy draft implements.

According to the present invention, the plunger spring is in the form of a variable rate spring which is subject to initial displacement by a relatively light load, the force required for additional displacement increasing relatively rapidly so as also to permit the spring to resist complete collapse and bottoming and complete displacement of the plunger by the maximum forces encountered by the top link under heavy draft.

Among the objects of the present invention are to provide an improved draft control system for power-liftable tractor hitches having increased sensitivity for light draft loads and which at the same time is operable with heavy draft implements, to provide such a system which is simple and dependable in operation and economical to produce, and generally to improve control systems of the type described.

The invention will be further described with reference to the accompanying drawings in which:

FIGURE 1 is a somewhat diagrammatic left side elevation of the rear portion of a tractor, the left wheel and portions of the left axle being removed or broken away and portions of the hydraulic control system being shown in vertical section through the centerline of the tractor.

FIGURE 2 is an enlarged fragmentary vertical section of the draft control plunger and spring and associated parts, showing a second form of control spring.

FIGURE 3 is a view similar to FIGURE 2, showing a third form of control spring.

Figure 4:
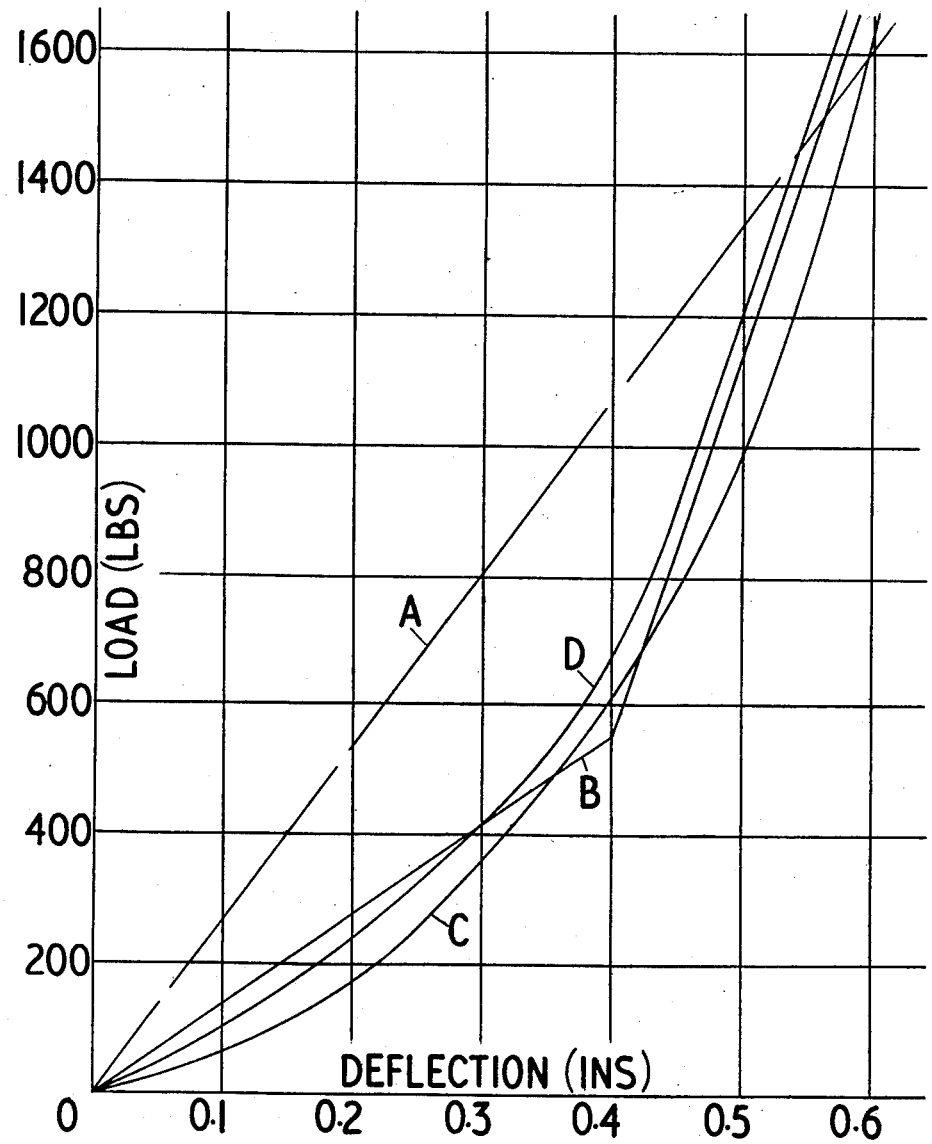
FIGURE 4 is a graph illustrating the range over which the rate of the spring varies.

Referring now to FIGURE 1, the tractor draft control system shown therein is generally similar to that shown in Ferguson U.S. Patent 2,356,231, a pair of lower draft links, one link 1 being shown in FIGURE 1, and a top link 2 of the 3-point hitch projecting rearwardly from the rear axle 11 of the tractor. The forward ends of the draft links 1 are pivotally mounted to the tractor rear axle and the forward end of the top link 2 is pivotally connected to a rocker 3 which is pivoted to the rear axle by a pin 5.

The rocker 3 is connected to a valve operating lever 8 by linkage including a draft sensing plunger 6, compression in the top link 2 serving to rotate the rocker 3 about the pin 5 and move the draft sensing plunger forwardly. A spring 7, preferably coaxial with the plunger 6 is compressed by forward movement of the plunger, the spring taking the entire thrust resulting from the compressive forces in the top link 2.

A hydraulic fluid control valve 9 is operated by movement of the control lever 8 to control the flow of fluid to and from a hydraulic cylinder or ram 12. A piston 14 within the cylinder 12, acting through a connecting rod 15 and lever 16, operates a rock shaft 17 to which the lever is fixed. A pair of lift arms are fixed to the ends of the rock shaft 17 at each side of the tractor housing, one lift arm 18 being shown. The lift arms 18 are connected to the draft links 1 by lift links 19. The arrangement is such that upon the compression in the top link 2 exceeding a predetermined amount due to increased draft, the valve 9 will be opened to admit hydraulic fluid under pressure to the cylinder 12, forcing the piston 14 rearwardly to rock the shaft 17 slightly and slightly raise the draft links 1 to reduce draft, this action continuing until the compression within the top link 2, which is a function of the draft on the implement, has decreased to a predetermined setting.

A hand or quadrant lever 10 operates a crank 20, upon which the upper end of the control lever 8 is pivoted, movement of the lever 10 displacing the crank 20 and upper end of the lever 8, so as to vary the degree of compression of the spring 7 at which the valve 9 will be in neutral position, in which it is neither admitting fluid to nor releasing fluid from the cylinder 12. The hydraulic system described in the detailed description above is well-known and employed in the Ford tractor.

According to the present invention, the spring 7 is a variable rate spring rather than a constant rate spring. In a variable rate spring, the amount of displacement of the spring for a given increase in load is not uniform, but varies from a low rate to a substantially higher rate with increased stress. For example, a relatively small compression in the top link 2 will serve to compress the spring 7 a measurable amount, permitting the draft sensing plunger 6 to be moved forward slightly and thus permitting the sensing of a small compressive top link force resulting from light draft implements or an implement in which a greater draft is counterbalanced by heavy overhanging implement weight tending to create tension rather than compression in the top link 2.

For heavy draft implements, the additional compressive forces in the top link 2 will additionally compress the spring 7, the resistance of the spring 7 to compression increasing with the additional compression. Thus, the spring 7 not only resists bottoming or complete compression by heavy drafts, but also renders the draft control system sensitive in about equal degree to change both in light draft and heavy draft operation. Use of a variable rate spring provides for actuation of the valve 9 to correct implement height in order to maintain constant draft at about the same percent of change in draft from that selected, whether the tractor is operating with a light draft or heavy draft implement.

In the form of the invention shown in FIGURE 1, the spring 7 is formed of turns of wire which are uniformly spaced but of increasing diameter from one end of the spring to the other. When the spring 7 is compressed, the larger diameter turns of the spring will be displaced to a greater degree than the small diameter turns, providing the variable rate spring action above described.

Referring now to FIGURE 2, the assembly of draft sensing plunger 6, spring 7a, and associated parts is generally the same as that shown in FIGURE 1, except that spring 7a is a different type of variable rate spring. The spring 7a is of uniform diameter throughout its length, but the turns of the spring are spaced more closely at one end of the spring than at the other end, the spacing between the turns preferably increasing more or less uniformly throughout the length of the spring. A spring of this type may be used instead of spring 7 of FIGURE 1 to obtain substantially the same results.

FIGURE 3 shows a draft sensing plunger 6, spring 7b, and associated parts, which is a further modified form of the invention shown in FIGURE 1. The spring 7b of FIGURE 3 may be formed of a stack of "Belleville" washers (spring washers of conical form) arranged as indicated in the drawing. Preferably, the washers all have identical compression characteristics, being arranged in sets of one, two, three and four washers confronting corresponding numbers of washers. Thus, as the spring 7b is placed under compression, the portion of the spring formed by single confronting "Belleville" washers will compress to a greater degree and the portion of the spring formed of four stacked "Belleville" washers confronting another set of four "Belleville" washers will be compressed to a lesser degree. In this fashion, the spring 7b will operate as a variable rate spring substantially in the manner of the springs 7 and 7a previously described.

In FIGURE 4 there is plotted the load vs. deflection curves for: A, a constant rate coil spring; B, a pair of constant rate coil springs as in Edman U.S. Patent 2,900,030; and C and D, actual sample variable rate coil springs of the type shown in FIGURE 2 and having the following nominal dimensions:

| | |
|---|---|
| Free length | 4.12 in. |
| No. of coils | 7.8 in. |
| Wire diameter | 0.468 in. |
| Inside diameter | 1.53 in. |
| Outside diameter | 2.47 in. |
| Max/s | {42 ton/sq. in. <br> {58 ton/sq. in. corr. |

I claim:

1. In a tractor having a rear axle assembly provided with a 3-point implement hitch including a pair of power-liftable draft links and a top link, and in which draft on an implement mounted on said hitch produces forward thrust on the top link; means, including a hydraulic cylinder, for lifting the draft links, and draft responsive mechanism for controlling operation of the hydraulic cylinder responsive to the forward thrust of the top link, said mechanism including a draft sensing plunger mounted for longitudinal movement in the rear axle assembly and connected with and displaced by the thrust of said top link, and a coaxial variable rate coil spring interposed between the rear axle assembly and plunger and compressed by displacement of the plunger, said spring comprising a single coil having turns of uniform diameter spaced increasingly further apart from one end of the spring to the other to provide a variable rate spring of generally uniformly increasing rate as it is compressed, the draft sensing plunger being axially displaced varying amounts dependent on the amount of forward thrust on the top link.

2. In a tractor having a rear axle assembly provided with a 3-point implement hitch including a pair of power-liftable draft links and a top link, and in which draft on an implement mounted on said hitch produces forward thrust on the top link; means, including a hydraulic cylinder, for lifting the draft links, and draft responsive mechanism for controlling operation of the hydraulic cylinder responsive to the forward thrust of the top link, said mechanism including a draft sensing plunger mounted for longitudinal movement in the rear axle assembly and connected with and displaced by the thrust of said top link, and a coaxial variable rate coil spring interposed between the rear axle assembly and plunger and compressed by displacement of the plunger, said spring comprising a single coil having turns of uniform diameter spaced increasingly further apart from one end of the spring to the other to provide a variable rate spring of generally uniformly increasing rate as it is compressed, the draft sensing plunger being axially displaced varying amounts dependent on the amount of forward thrust on the top link and the plunger being displaced generally equal amounts by the same percent of change in draft throughout the operating range of the mechanism.

References Cited in the file of this patent
UNITED STATES PATENTS

| | | |
|---|---|---|
| 351,698 | Harter | Oct. 26, 1886 |
| 431,250 | Cliff | July 1, 1890 |
| 1,386,855 | Ewing | Aug. 9, 1921 |
| 2,387,266 | Holland | Oct. 23, 1945 |
| 2,871,963 | Harris et al. | Feb. 3, 1959 |
| 2,900,030 | Edman | Aug. 18, 1959 |